June 29, 1943.　　W. D. VAN ZELM　　2,323,279
CARGO LANDPLANE
Filed Aug. 20, 1942　　3 Sheets-Sheet 2
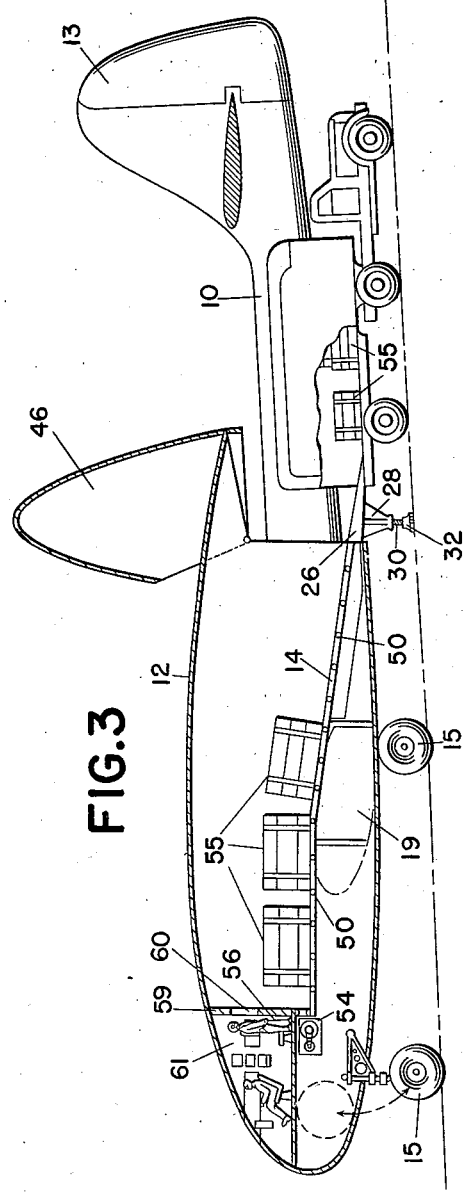
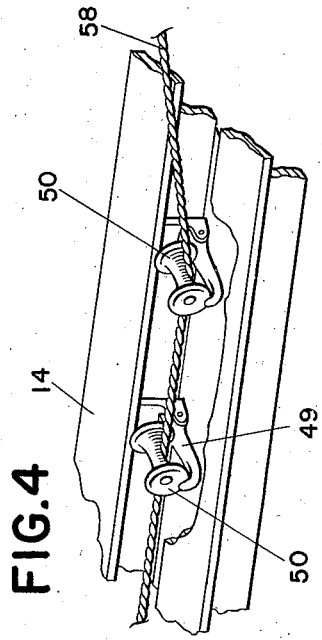
INVENTOR.
WILLEM D. VAN ZELM
BY
ATTORNEY June 29, 1943.  W. D. VAN ZELM  2,323,279
CARGO LANDPLANE
Filed Aug. 20, 1942  3 Sheets-Sheet 3

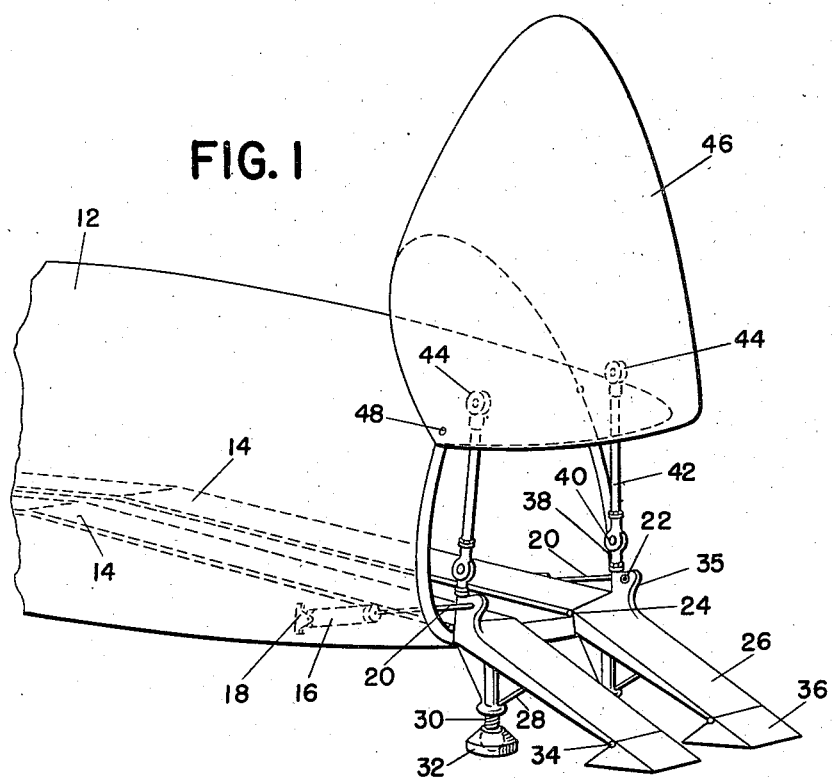

INVENTOR.
WILLEM D. VAN ZELM
BY
ATTORNEY

Patented June 29, 1943

2,323,279

UNITED STATES PATENT OFFICE 2,323,279

CARGO LANDPLANE

Willem D. van Zelm, Ruxton, Md., assignor to The Glenn L. Martin Company, Middle River, Md., a corporation of Maryland Application August 20, 1942, Serial No. 455,463

5 Claims. (Cl. 214—85)

This invention relates to improvements in material or article handling vehicles, and more particularly to cargo carrying vehicles of the type that are adapted to receive, handle, and store freight within themselves, independently of any external motivating force.

The invention overcomes one of the principal disadvantages of the present day cargo handling type of airplane, in that it provides a simple and efficient means for quickly receiving and storing miscellaneous items of freight, without allowing the airplane to become unbalanced or upset and subject to damage during the loading or unloading operation.

The primary object of the present invention is to provide an efficient airplane, containing material or article handling equipment which will substantially reduce the time required for the loading and unloading operations.

Another object of the present invention is to provide a self-sufficient material or article handling cargo airplane that will not upset during a high speed loading and unloading operation.

Still another object of the present invention is to provide a cargo carrying airplane that can be automatically disposed to receive freight of different types and sizes.

A further object of the invention is to provide a cargo carrying airplane having material or article handling means whereby said means can be operated to receive and store freight of different types and sizes.

Further and other objects will become apparent from the description of the accompanying drawings which form a part of this disclosure and in which like numerals refer to like parts.

Figure 1 is a perspective view of a part of the material or article handling means of a cargo carrying airplane shown with loading means.

Figure 2 is a fragmentary perspective of the means shown in Figure 1 with the loading means stowed.

Figure 3 is a sectional view of the cargo carrying airplane showing the general arrangement of the material or article handling apparatus in an alternative loading or unloading position.

Figure 4 is a fragmentary perspective view of another part of the material or article handling apparatus of the cargo carrying airplane.

Figure 5:
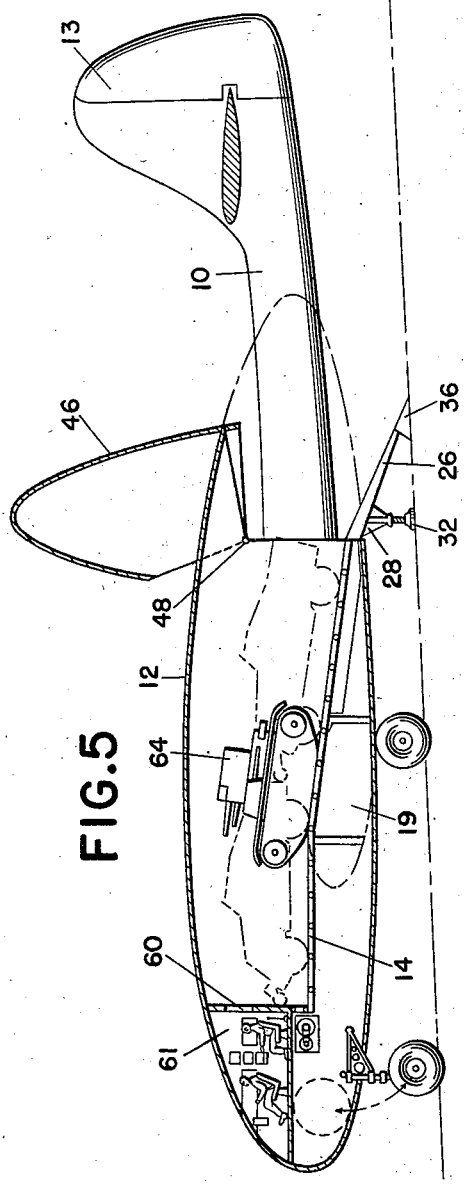
Figure 5 is a sectional view of the cargo carrying airplane showing the general arrangement of the material or article handling apparatus in an alternative loading or unloading position.

A cargo carrying airplane, having a body portion 12, booms 10, empennage 13, wing 19, landing gear 15, control room 61, is provided with a cargo door 46, which is secured thereto by means of the hinges 48.

The body portion 12 is constructed so as to provide a cargo compartment therein.

This cargo compartment has an inclined floor 14. The floor extends from the control room 61, within and at the front of the body portion, to the cargo door 46 at the rear. This cargo door, which is secured by the hinges 48 to the body portion, is constructed so that it forms a portion of said body portion when in the closed and locked position. It is likewise so constructed that it may be swung about the hinges 48 to provide a suitable entrance into the interior of the said body portion. In the open position, the cargo door 46 is held in a position above the opening in the body portion, so that it will not interfere with the loading and unloading of the cargo compartment and will provide free access thereto.

Within the body portion and located at a point near the cargo door, are the piston members 16 which are pivoted on brackets 18 attached to the body portion. The piston members are adapted to be actuated by a fluid or other similar actuating means from a remote point, for instance, from within the control room.

The piston members are provided with the piston arms 20 which are pivotally secured to the extended portions 35 of ramps 26 which are, in turn, hingedly secured at 24 to the inclined flooring 14. The extended portions of the ramps likewise carry arms 38, which are connected to the cargo door through the hinges 40, the arms 42 and the hinges 44.

In operation, a remote control 56 in the control room 61 is actuated to displace fluid in the piston members 16 causing the piston arms 20 to retract into the piston members. The retracting piston arms which are pivotally secured at 22 to the extended portions 35 of the ramps 26 simultaneously cause the ramps to turn about the axis of the hinges 24. The hingedly connected arms 38 and 42 will bend at hinges 40, causing the cargo door, which is hingedly connected to the arms 42 by the hinges 44, to turn about the axis of the hinges 48. Thus, by retracting the piston arms 20 into the piston members, the ramps are withdrawn into the cargo compartment and the cargo door is simultaneously closed and held or locked in closed position. When the piston arms 20 are extended from the piston members, the ramps are extended out of the cargo compartment as the cargo door simultaneously opens. The ramps which have the feet 36 secured to their outer ends by means of the hinges 34, can be extended to varying degrees, depending on the type or size of cargo to be taken into the cargo compartment because the vertical displacement of the arms 28 in rotation about the axis of the hinges 24 is relatively small when compared with the vertical displacement of the outer ends of the ramps or feet 36, which are rotated about the same axis.

The ramps are provided with reinforcing members in the nature of jacks secured to them at points adjacent their axis of rotation. These reinforcing members are preferably formed by attaching screw housings 28 to the ramps, and then by threading the legs 30, having the feet portions 32 in and out of the housings 28, as desired. These reinforcing members cooperate in fulcrum fashion with the hydraulically extending ramps and the body portion to balance the airplane during the loading and unloading operations.

In Figure 3, a truck is shown in position under the tail 13 and between the booms 10 of the airplane. The ramps are shown in partially extended position so that the tail board of a truck could be backed under them. The ramp reinforcing jack has been adjusted so that the weight of the freight will not be transmitted to the body portion until it has passed the hinges 24. Thus, it is possible to maintain the cargo airplane in balance, as freight 55 is removed from the truck. An operator in the control room, looking through opening 57 in wall 59, or through a window 60 in wall 59, can pull the freight into the cargo compartment by means of a power operated winch 54 and a cable 58, which travels beneath the plane of the inclined flooring 14 as directed there by any one, or all, of the guide rollers 50. The cable, due to its position beneath the plane of the flooring, is adapted to reduce force that might be set up to unbalance the airplane during the loading and unloading operations.

The guide rollers are likewise adapted to pass the cable around freight already stored in the cargo compartment. They are mounted on suitable brackets 49 which lie beneath the plane of the flooring.

In Figure 5 the ramps 26 are shown balancing the airplane while allowing freight, in the nature of a self-powered tank 64, to be driven into the cargo compartment.

Figure 6:
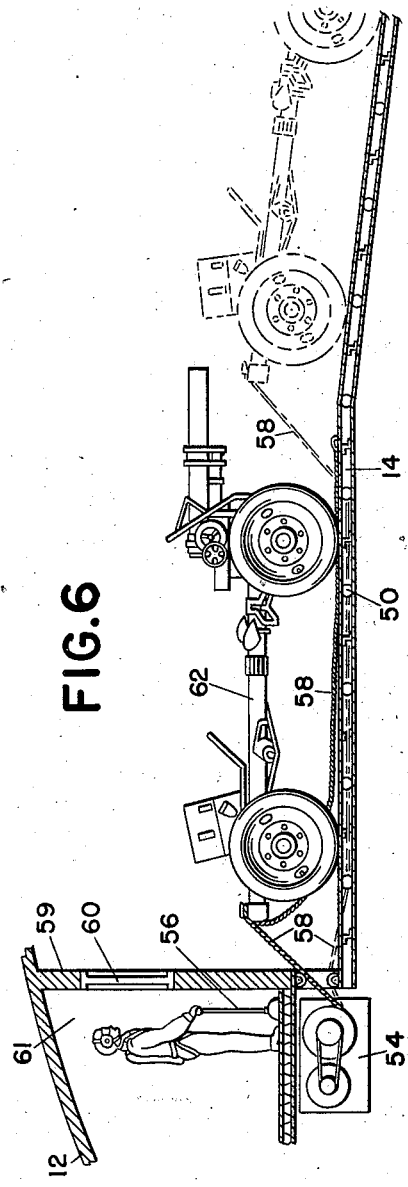
Figure 6 is an enlarged fragmentary sectional view showing the general assembly of a part of the material or article handling apparatus shown in Figure 4.

Figure 6 illustrates how still another type of freight such as the gun carriages 69 may be drawn within the cargo compartment and secured there, by an operator in the control room. An operator is pictured working the winch control lever 56 to actuate winch 54 and draw in the cable 58 which has been secured at its other end to a gun carriage 62. After the gun carriage has been drawn within the cargo compartment, it may be secured by any suitable fastening means and the winch and the cable cooperating with the rollers 50 can again be used to draw in more freight. Depending upon the size of the cargo compartment to be loaded or unloaded, one or more winch and cable assemblies may be used. It would also be permissible to operate a plurality of cargo handling cables by means of a compound winch. The winch 54, the low travelling cables, the slope of the cargo compartment floor, and the balancing door-ramp construction all cooperated to provide an efficient vehicle contained and operated material or article handling means which will substantially reduce the time required for the loading and unloading operations while preventing the airplane from upsetting. The flooring is inclined downwardly from the control room to the ramps to limit the quantity of material that might be placed forward of the center of gravity of the airplane. Due to the inclination of the flooring, inadvertent overloading and consequent unbalancing of the vehicle is avoided.

It is to be understood that certain changes, alterations, modifications and substitutions can be made without departing from the spirit and scope of the appended claims.

I claim as my invention:

1. Material or article handling apparatus comprising a vehicle having a cargo compartment therein, a cargo door forming a part of said vehicle and said cargo compartment, an extensible cargo loading and vehicle balancing ramp forming a part of said vehicle and located within said cargo compartment adjacent the point of intersection of said cargo compartment with said cargo door, and means located within said vehicle for opening and closing said cargo door and simultaneously extending and retracting said loading and balancing ramp.

2. A material or article handling vehicle comprising a main body portion, a cargo compartment therein, a cargo door forming a part of said main body portion and said cargo compartment, a vehicle loading and balancing ramp within said cargo compartment, a portion of said ramp hinged for extending through the opening in said body portion, means for opening and closing said cargo door and means cooperating with said first means for simultaneously extending and retracting said ramp portion.

3. In a material or article handling vehicle of the type that is provided with a cargo compartment and cargo door forming a part of said vehicle and giving access to said compartment, a loading and balancing mechanism mounted on said vehicle adjacent said cargo door comprising a hinged ramp portion adapted to be extended and retracted in and out of said cargo door opening, and means secured to said ramp portion for opening and closing said cargo door as said ramp is extended or retracted.

4. A material or article handling device for cargo carrying vehicle comprising a main vehicle body portion having a cargo compartment therein, a cargo door forming a part of said main vehicle body portion and giving access to said cargo compartment, a ramp, an adjustable jack depending from said ramp to balance the vehicle during the loading and unloading operation, for opening and closing said cargo door and means cooperating with said first means for extending and retracting said ramp simultaneously with the opening and closing of said door.

5. A cargo carrying airplane comprising a main body portion, having a cargo compartment therein, and having a loading door at the rear end thereof, wings attached to said main body portion, said wings having mounted thereon a pair of booms extending substantially parallel to the main body portion and to the rear thereof supporting the empennage, tricycle landing gear supporting the airplane so that the main body portion is supported in a substantially horizontal position and the empennage maintained in an elevated position whereby ample clearance is afforded for ready access to the unloading door.

WILLEM D. VAN ZELM.

DISCLAIMER 2,323,279.—*Willem D. van Zelm*, Ruxton, Md. CARGO LANDPLANE. Patent dated June 29, 1943. Disclaimer filed August 10, 1944, by the assignee, *The Glenn L. Martin Company.*

Hereby enters this disclaimer to claim 5 in said specification.

[*Official Gazette September 5, 1944.*]